United States Patent
Schuman

(10) Patent No.: US 12,507,034 B2
(45) Date of Patent: *Dec. 23, 2025

(54) SYSTEMS AND METHODS FOR USERS TO RECEIVE AND/OR REPLY TO INFORMATION AFFILIATED WITH COMMUNICATION ATTEMPTS WHILE REMAINING SUBSTANTIALLY DISCONNECTED FROM MOBILE ELECTRONIC DEVICE(S) AND/OR NETWORKS

(71) Applicant: Joseph Schuman, New York, NY (US)

(72) Inventor: Joseph Schuman, New York, NY (US)

( * ) Notice: Subject to any disclaimer, the term of this patent is extended or adjusted under 35 U.S.C. 154(b) by 329 days.

This patent is subject to a terminal disclaimer.

(21) Appl. No.: 18/124,539

(22) Filed: Mar. 21, 2023

(65) Prior Publication Data
US 2023/0262411 A1 Aug. 17, 2023

Related U.S. Application Data

(63) Continuation of application No. 17/121,743, filed on Dec. 14, 2020, now Pat. No. 11,611,844, which is a continuation of application No. 13/645,051, filed on Oct. 4, 2012, now Pat. No. 10,869,157.

(60) Provisional application No. 61/542,891, filed on Oct. 4, 2011.

(51) Int. Cl.
*H04W 4/00* (2018.01)
*H04M 1/72451* (2021.01)
*H04M 1/65* (2006.01)
*H04M 1/663* (2006.01)

(52) U.S. Cl.
CPC ......... *H04W 4/00* (2013.01); *H04M 1/72451* (2021.01); *H04M 1/6505* (2013.01); *H04M 1/663* (2013.01); *H04M 2250/60* (2013.01)

(58) Field of Classification Search
None
See application file for complete search history.

(56) References Cited

U.S. PATENT DOCUMENTS

2006/0281449 A1* 12/2006 Kun ..................... H04M 1/575
455/418
2009/0047933 A1* 2/2009 Spitzer .................. H04M 1/642
455/412.1

FOREIGN PATENT DOCUMENTS

EP 1523162 A1 * 4/2005 ............. G06F 9/546

OTHER PUBLICATIONS

Google translation of EP 1523162 (Year: 2005).*

* cited by examiner

*Primary Examiner* — German Viana Di Prisco
(74) *Attorney, Agent, or Firm* — Tarter Krinsky & Drogin LLP

(57) ABSTRACT

The invention generally relates to systems and methods that enable processor readable instruction(s) (e.g., an un-wired algorithm, an un-wired application, an un-wired services, etc.), stored in processor readable media(s), to be accessed and/or processed on mobile electronic devices (e.g., "mobile phones") and/or networks such that, for example, when activated by user(s) and/or authorized parties, the mobile electronic device's alert (e.g., audiovisual alert, vibrator, etc.) can be deactivated. Further, when the un-wired application is activated customizable replies can automatically and/or substantially automatically be communicated in response to missed communication attempts (e.g., voice calls, video calls, texts, e-mail, etc.).

18 Claims, 9 Drawing Sheets

SYSTEMS AND METHODS FOR USERS TO RECEIVE AND/OR REPLY TO INFORMATION AFFILIATED WITH COMMUNICATION ATTEMPTS WHILE REMAINING SUBSTANTIALLY DISCONNECTED FROM MOBILE ELECTRONIC DEVICE(S) AND/OR NETWORKS

CROSS-REFERENCE TO RELATED APPLICATIONS

This application is a continuation of pending U.S. patent application Ser. No. 17/121,743 which is to issue on Mar. 21, 2023 as U.S. Pat. No. 11,611,844, which itself is a continuation of U.S. patent application Ser. No. 13/645,051 filed on Oct. 4, 2012 and which issued as U.S. Pat. No. 10,869,157 on Dec. 15, 2020, which claims the benefit of and priority to U.S. provisional patent application Ser. No. 61/542,891, filed Oct. 4, 2011, the disclosure of which is incorporated herein by reference in its entirety.

FIELD OF THE DISCLOSURE

The present disclosure generally relates to systems and methods for users to receive and/or reply to information affiliated with communication attempts while remaining substantially disconnected from mobile electronic device(s) and/or network(s).

BRIEF DESCRIPTION OF THE DRAWINGS

The features and/or advantages of the present disclosure will be more fully understood with reference to the following, detailed description when taken in conjunction with the accompanying figures, wherein.

DETAILED DESCRIPTION

Figure 1:
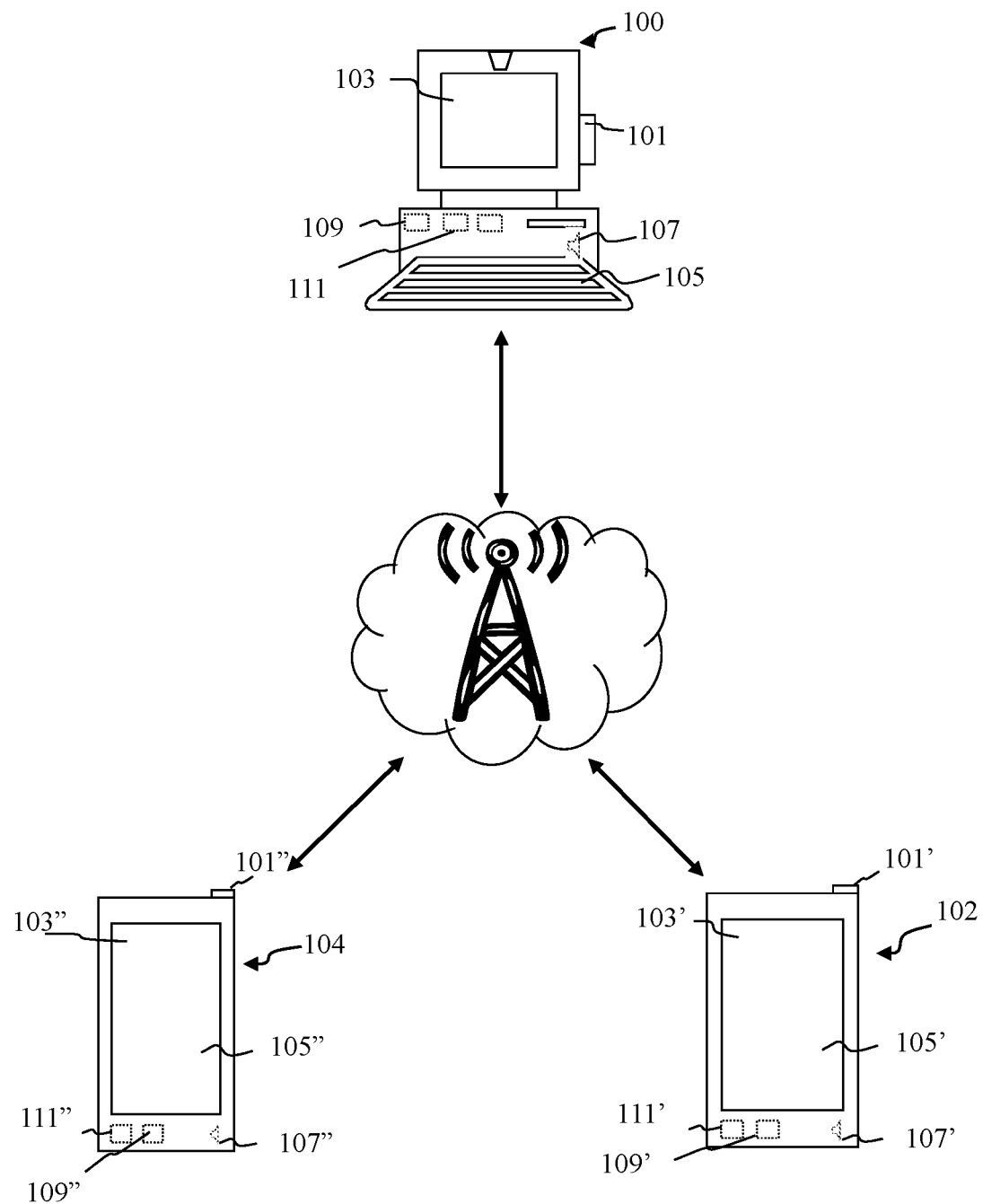
FIG. 1 is a block diagram of certain components of the systems and methods for users to receive information affiliated with communication attempts while remaining substantially disconnected from mobile electronic device(s) and/or network(s), in accordance with exemplary embodiments of the present invention.

The invention generally relates to systems and methods that enable processor readable instruction(s) (e.g., an un-wired algorithm, an un-wired application, an un-wired services, etc.), stored in processor readable media(s), to be accessed and/or processed on mobile electronic devices (e.g., "mobile phones") and/or networks such that, for example, when activated by user(s) and/or authorized parties, the mobile electronic device's alert (e.g., audiovisual alert, vibrator, etc.) can be deactivated. Further, when the un-wired application is activated customizable replies can automatically and/or substantially automatically be communicated in response to missed communication attempts (e.g., voice calls, video calls, texts, e-mail, etc.).

In exemplary embodiments, the communication attempt can be, but is not limited to, voice calls, video calls, texts, and/or e-mail, to name a few. Further, the communication attempt can be, but is not limited to, any communication attempt that can be from other applications affiliated with any mobile electronic device applications, including, but not limited to, text, voice, and/or email, to name a few. By way of example, by interacting with a user interface a user could unwire face-book updates, tweets, and/or gaming reminders, to name a few, and/or the un-wired application can work with other aggregating applications which can, by way of example, filter any number of information communications (e.g., feeds) into any number of platforms and/or single platform.

In exemplary embodiments, the un-wired application can comprise a simple one button interface for basic un-wiring from incoming communication attempts with standard default replies and/or customizable replies, a can function as a caching and/or logging mechanism for missed communication attempts during un-wiring, and/or can comprise management for administrating advanced active communication functions. This can include customizable filters, communication attempt bins, reply bins, group management of devices and/or users, and/or additional semi-autonomous communication functions across various formats, devices, users and/or use cases.

In exemplary embodiments, the un-wired application, amongst other things, (i) can enable users to be "un-wired" (e.g., not receive communication attempts) from their mobile electronic device (e.g., enabling working, sleeping, eating, driving, working out, allocating quality time with others, relaxation in solitude, etc.); (ii) can enable reduced risk that contacts (e.g., individuals with missed communication attempts) will feel their communication attempts have been screened and/or neglected (e.g., freeing users from having to provide immediately replies); (iii) can enable users to "pattern" communication attempts to, for example, manage how incoming communication attempts may be responded to (e.g., replied to, not replied to, etc.); (iv) can enable users to be provided with information affiliated with missed communication attempts when the user "re-wires" (e.g., receives communication attempts); (v) can enable users to categorize specific people, groups, and/or replies into "bins"; (vi) can enable users to screen communication from specific people (e.g., ex-spouses, work, etc.) and/or groups (e.g., work, groups of individuals, etc.); (vii) can enable users to inform specific people and/or groups that they may be being screened and/or provide customizable replies; and/or (viii) can respond to missed communication attempts using the mobile electronic device and/or mobile electronic device's host network. Further, in exemplary embodiments, the un-wired application, amongst other things, can utilize caching, delaying, and/or logging functionality, to name a few.

Referring to FIG. 1, it will be understood that any of host network system 100, user mobile electronic device system 102, and/or communication attempting device system 104 can communicate with each other and/or can be further combined and/or separated. For ease, host network system 100, user mobile electronic device system 102, and/or communication attempting device system 104 are, at times, shown separately. This is merely for ease and is in no way meant to be a limitation.

Further, any element of host network system 100, user mobile electronic device system 102, and/or communication attempting device system 104 can reside on and/or be affiliated with user mobile electronic device system 102, host network system 100, and/or communication attempting device system 104. For example, host network system 100 can include algorithm(s), stored in processor readable medium(s), that can be accessed and/or processed by processor(s) affiliated with user mobile electronic device system 102. Further still, host network system 100 can reside on and/or be affiliated with communication attempting device system 104. For example, host network system 100 can include algorithm(s), stored in processor readable medium(s), that can be accessed and/or processed by processor(s) affiliated with communication attempting device system 104.

As shown, host network system 100, user mobile electronic device system 102, and/or communication attempting device system 104 can include, but are not limited to, at least one communication portal 101, 101', 101"; at least one graphical user interface 103, 103', 103"; at least one user input 105, 105', 105"; at least one speaker 107, 107', 107"; at least one processor readable media 109, 109', 109"; at least one processor 111, 111', 111"; and/or any other reasonable components for use in communicating information (e.g., data), for example, via communication portal(s), storing information, processing processor readable instruction(s), and/or processing any form of information and/or storing information in processor readable medium(s).

In exemplary embodiments, graphical user interface 103, 103', 103" and/or user input(s) 105, 105', 105" can be substantially the same. For example, graphical user interface 103, 103', 103" and/or user input(s) 105, 105', 105" can be combined as a touch distribution system. The touch distribution system can be a display that can detect the presence and/or location of a touch within the distribution system area.

Host network system 100, user mobile electronic device system 102, and/or communication attempting device system 104 can be and/or be affiliated with, for example, a mobile phone, computer, iPad®, iPod®, iPhone®, smartphone, and/or Blackberry®, to name a few. Further, communication attempts can include remote push notifications services, local push notification services, and/or alert services, to name a few.

Host network system 100, user mobile electronic device system 102, and/or communication attempting device system 104 can include a plurality of subsystems and/or libraries, such as, but not limited to, contacts and/or groups library subsystem, screened contacts and/or groups library subsystem, open and/or closed screened contacts and/or groups library subsystem, communication attempts library subsystem, and/or customizable replies library subsystem, to name a few. Further, subsystems and/or library can be depicted, for example, in graphical user interface(s), as bins and/or tags. For ease, bins and/or tags and not subsystems and/or libraries are, at times, only used to describe groupings and/or depictions of information. This is merely for ease and is in no way meant to be a limitation.

In exemplary embodiments, at least some of the functional operations described in this disclosure can be implemented in digital electronic circuitry, in computer software, processor readable instruction(s), processor readable medium(s), processor(s), firmware, hardware, including the structures disclosed in this disclosure affiliated with host network system(s), mobile electronic device(s), communication attempting device(s), and their structural equivalents, and/or any further combination or separation thereof. In exemplary embodiments, the systems and methods disclosed can be implemented utilizing one or more modules of processor readable instruction(s) encoded on processor readable medium(s) for execution by, and/or to control the operation of, information processing apparatus such as, but not limited to processor(s). The processor readable medium(s) can be a machine readable storage device, a machine readable storage substrate, a memory device, and/or any further combination or separation thereof.

The host network system(s), mobile electronic device(s), communication attempting device(s), the un-wired application(s), and/or any further separation and/or combination thereof can encompass all and/or at least some apparatus, devices, and/or machines for processing information and/or processor readable instruction(s) including by way of example, a programmable processor(s), a computer, multiple processor(s) and/or computers, to name few. The systems and methods can further include, in addition to hardware, code and/or processor readable instruction(s) that can create an execution environment (e.g., code that constitutes processor firmware, a protocol stack, a database management system, an operating system, and/or any further combination and/or separation thereof, etc.).

In exemplary embodiments, the un-wired application (e.g., an un-wired algorithm, an un-wired application, an un-wired services, etc.), and/or computer program(s), program, software, software application(s), script(s), code(s), processor readable instruction(s) affiliated with the un-wired application can be written in any form of programming language, that can include compiling and/or interpreting languages, and/or it can be deployed in any form, including, but not limited to, a stand-alone program or a module, component, subroutine, and/or other unit suitable for use in a computing environment. It will be understood that the un-wired application does not necessarily correspond to a file in a file system. In exemplary embodiments, the un-wired application can be stored in a portion of a file and/or processor readable medium(s), to name a few, that can hold other programs, processor readable instruction(s), and/or information (e.g., one and/or more scripts stored in a markup language document, etc.), in a single file dedicated to the program in question, and/or in multiple coordinated files (e.g., files that store one and/or more modules, sub-programs, and/or portions of code, etc.). In exemplary embodiments, the un-wired application can be deployed to be executed on one system and/or on multiple systems, for example, mobile electronic device(s) and/or communication attempting device(s) that can be located at one site and/or distributed across multiple sites and/or interconnected by a communication network, for example, host network system(s) that can communicate, for example, via communication portal(s).

The processes and/or logic flows described in this disclosure, for example, affiliated with the un-wired application, can be performed by one and/or more programmable processor(s) executing one and/or more systems, for example, mobile electronic device(s), communication attempting device(s), and/or host network system(s) that can perform functions by operating on input information and/or generating output, for example, via communication portal(s). Further, the processes and/or logic flows described in this disclosure, for example, affiliated with the un-wired application, can be performed by one and/or more programmable processor(s) executing one and/or more systems, for example, on smart cards, SIM cards, and/or virtualized SIM card, to name a few. The processes and/or logic flows can also be performed by, and/or apparatus can also be implemented as, special purpose logic circuitry [e.g., an FPGA (field programmable gate array) and/or an ASIC (application-specific integrated circuit), to name a few].

In exemplary embodiments, processor(s) suitable for the execution of the un-wired application can include, by way of example, both general and/or special purpose microprocessor(s), and/or any one and/or more processor(s) of any kind. Generally speaking, processor(s) can receive processor readable instruction(s) and/or information from read-only memory, random access memory, and/or both. In exemplary embodiments, elements of systems and methods for users to receive information affiliated with communication attempts while remaining substantially disconnected from mobile electronic device(s) and/or network(s), can include processor(s) that can access processor readable instruction(s) and/or processor readable medium(s) for storing processor readable instruction(s) and/or information that can be accessed by processor(s). Also, in exemplary embodiments, the systems and methods can include, and/or be operatively coupled to receive, for example, via communication portal(s), information from and/or transfer information to, and/or both, one and/or more mass storage devices and/or processor readable medium(s) for storing information (e.g., magnetic, magneto-optical disks, and/or optical disks, to name a few). However, in exemplary embodiments, the systems and methods need not have such devices.

In exemplary embodiments, the un-wired application can be embedded in and/or affiliated with another device [e.g., personal digital assistant(s) (PDA), a mobile audio player(s), and/or a Global Positioning System(s) (GPS) receiver, host network system(s), mobile electronic device(s), and/or communication attempting device(s), to name a few]. Processor readable medium(s) suitable for storing processor readable instruction(s) affiliated with the un-wired application and/or storing information that can include all forms of non-volatile memory, media and/or memory devices, including by way of example, semiconductor memory devices (e.g., EPROM, EEPROM, and/or flash memory devices, etc.); magnetic disks (e.g., internal hard disks and/or removable disks, etc.); magneto-optical disks; and/or CD-ROM and/or DVD-ROM disks. The processor(s) and/or the memory can be supplemented by, and/or incorporated in, special purpose logic circuitry.

In exemplary embodiments, to provide for interaction with a user, the systems and methods can be implemented on a display device [e.g., graphical user interface(s) a CRT (cathode ray tube) and/or LCD (liquid crystal display) monitor, etc.] for displaying information to the user and/or user input(s) such as, but not limited to, a keyboard, a pointing device, a mouse, a trackball, any further separation and/or combination thereof and/or by any user input(s) which the user can provide input to host network system(s), mobile electronic device(s), communication attempting device(s), the un-wired application(s), and/or any further separation and/or combination thereof and/or any other element affiliated with the systems and methods disclosed. Further, other forms of devices can be used to provide for interaction with a user as well. For example, feedback provided to the user can be any form of sensory feedback (e.g., visual feedback, auditory feedback, and/or tactile feedback, etc.); and/or input from the user can be received in any form, including acoustic, speech, and/or tactile input, to name a few.

In exemplary embodiments, the systems and methods can be implemented utilizing systems and methods that can include a back-end component(s) (e.g., as a information server), and/or that can include a middleware component (e.g., an application server), and/or that can include a front-end component (e.g., host network system(s), mobile electronic device(s), and/or communication attempting device(s), to name a few), having graphical user interface(s) and/or a Web browser through which a user can interact with an implementation of the disclosure and/or any combination of one and/or more such back-end, middleware, and/or front-end components. The components of the systems and methods can be interconnected by any form and/or medium of digital information communication (e.g., a communication network and host network system, to name a few). Examples of communication networks and/or host network system include a local area network ("LAN"), a wide area network ("WAN") (e.g., the Internet, and/or telephonic networks, to name a few).

In exemplary embodiment, the un-wired application can silence user mobile electronic device system 102 audio alerts, for example, speaker(s), and/or automatically communicate, for example, via communication portal(s), default replies and/or customizable replies to anyone attempting to communicate with the user. Accordingly, utilizing the un-wired application, calls, texts, and/or any other communication attempts may not be received until a later time. As previously mentioned, this can result in contacts not feeling that their communication attempts have been screened and/or neglected, and/or user can be substantially freed from the expectation of providing immediate replies to communication attempts. Accordingly, the un-wired application can provide an environment more conducive for working, sleeping, eating, driving, working out, allocating quality time with others, and/or relaxation in solitude, to name a few.

Figure 2:
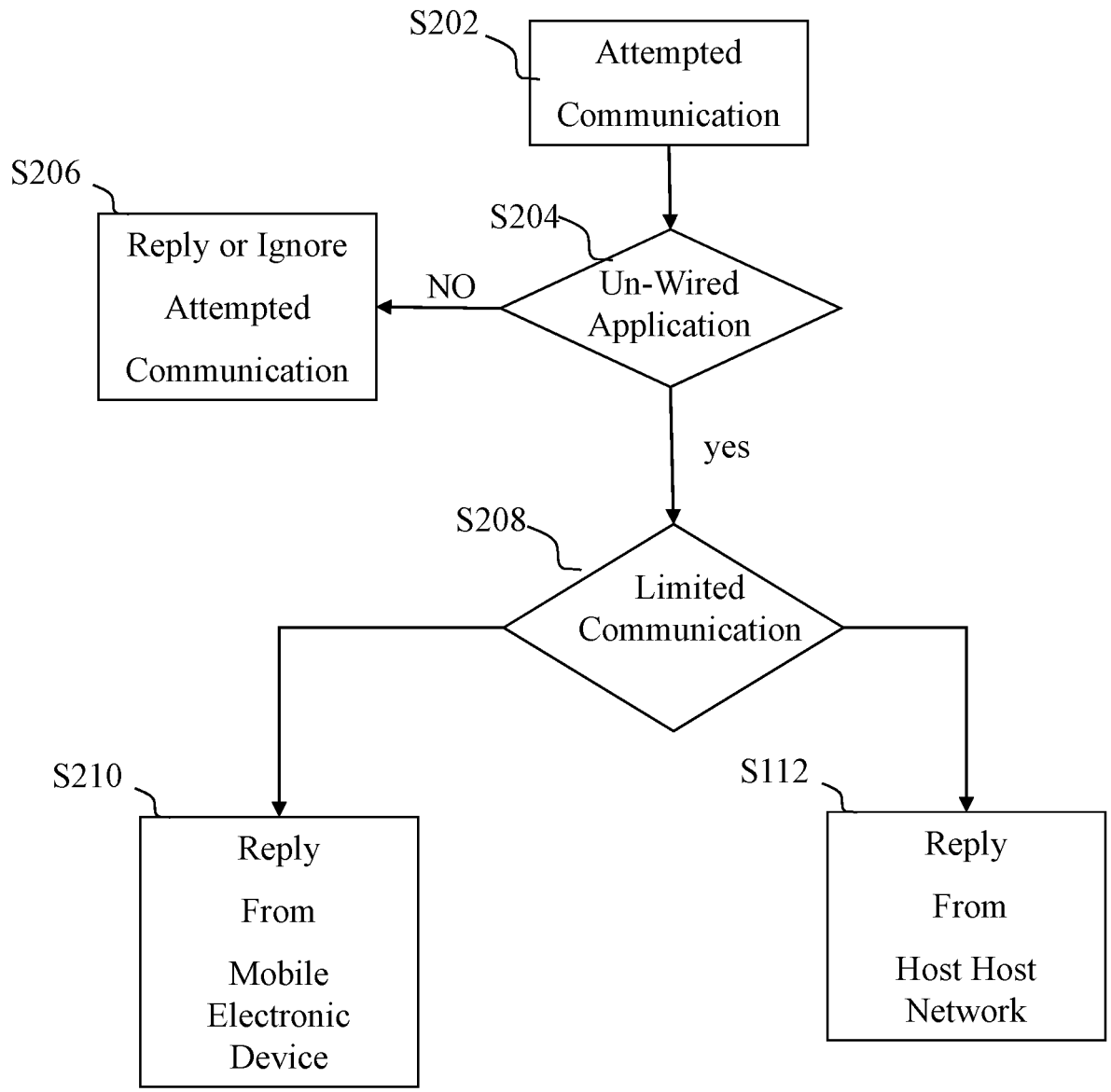
FIG. 2 is a flowchart illustratively depicting exemplary replies to communications attempts from host network system 100 and/or user mobile electronic device system 102 with limited connectivity, in accordance with exemplary embodiments of the present invention.

Referring to FIG. 2, in exemplary embodiments, at S202, communication attempts are communicated to user mobile electronic device system 102 (not shown), at S204, and if the un-wired application is not active, at S206, the user can reply or ignore to the communication attempts. Further, in exemplary embodiments, if the un-wired application is active, at S204. Then, at step 208, if there is limited communication with either user mobile electronic device system 102 (not shown) and/or with host network system 100 (not shown) then, at step 210, a reply can be communicated from user mobile electronic device system 102 (not shown) and/or, at step 212, a reply can be communicated from host network system 100 (not shown).

For example, in exemplary embodiments, the un-wired application can operate on user mobile electronic device system 102 and/or with host network system 100, such that if user mobile electronic device system 102 is, for example, off and/or user mobile electronic device system 102 is, for example, in an area with limited and/or no coverage and/or in response to a transmissions termination (e.g., a dead spot, dropped call, etc.) customizable replies can be automatically communicated in response to missed and/or terminated communication attempts. In exemplary embodiments, customizable replies can be automatically communicated in response to missed and/or terminated communication attempts by, for example, processor readable instruction(s) stored in processor readable medium(s) being executed by processor(s) causing customizable replies to be communicated, for example, via communication portal(s). Further, in exemplary embodiments, information the user stores in the un-wired application can be synchronized with host network system 100 affiliated with user mobile electronic device system 102 and/or stored on the user mobile electronic device system 102.

For another example, in exemplary embodiments, information and/or processor readable instruction(s) can be stored on host network system 100, for example, in processor readable medium(s) affiliated with host network system 100 such that when user mobile electronic device system 102 is, for example, unavailable (e.g., off, without service, in a dead spot, etc.) host network system 100 can respond to communication attempts with the appropriate customizable replies (e.g., screened replies, specific customized replies for users and/or groups, etc.) by, for example, the processor readable instruction(s) stored in processor readable medium(s) being executed by processor(s). Further, in exemplary embodiments, these modified settings, for example, modified processor readable instruction(s), can be stored in the host network system initially and/or they can be synchronized with the corresponding devices when users access the un-wired application and/or when the mobile electronic device affiliated with the un-wired application is re-wired.

Figure 3:
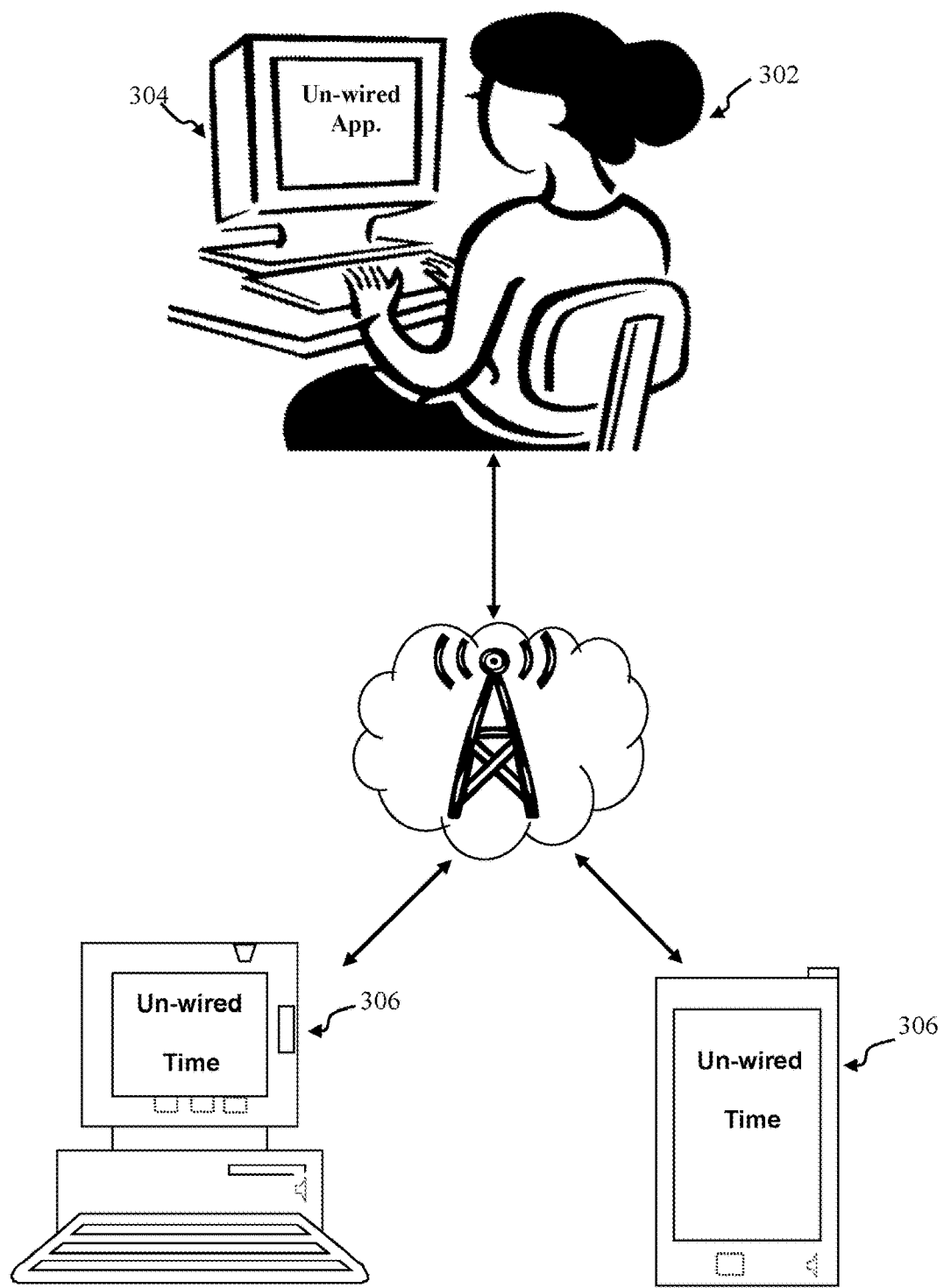
FIG. 3 is a drawing illustratively depicting a user administrator activating and/or de-activating the un-wired application from another device, in accordance with exemplary embodiments of the present invention.

Referring to FIG. 3, in exemplary embodiments, users with administrative 302 privileges can administer settings on their own and/or other devices 304 (e.g., a mobile phone, computer, iPad®, iPod®, iPhone®, smartphone, and/or Blackberry®, etc.) through an installed un-wired application on another device 306 (e.g., a mobile phone, computer, iPad®, iPod®, iPhone®, smartphone, and/or BlackBerry®, etc.). By way of example, parents can manage the un-wired times (e.g., time when communication attempts) of their children, for example, during school and/or homework times. By way of another, an IT department can manage the un-wired times (e.g., default holiday un-wiring times, etc.) globally across their company's mobile electronic devices.

In exemplary embodiments, bins can allow users of the un-wired application to buffer all and/or some communication while maintaining open communication lines, for example, communicated via communication portal(s), to desired contacts and/or contact groups. By way of example, parents of small children, people in love, and/or anyone expecting important news can utilize this function such that they may not be fully disconnect from the all communication attempts, for example, communicated via communication portal(s), to their mobile electronic device.

In exemplary embodiments, missed communication attempts which are, for example, stored in processor readable medium(s), can be reviewed by the user at a later time, for example, using graphical user interface. Further, in exemplary embodiments, communication attempts can be displayed, for example, graphical user interface(s), in a single bin and/or users can create and/or customize further bins, for example, such that contacts in their device can be assigned to one or more specific bins ("tags"). By way of example, utilizing bins ("tags") a user could review all and/or some communication attempts sorted into bins ("tags") such as, but not limited to, "family", "work", and/or "girlfriend", to name a few, upon re-wiring. Further, in exemplary embodiments, bins as used in the un-wired application can be shared and/or synchronized with other users and/or devices enabling, for example, seeing missed video calls and/or email on a tablet computer and/or on a mobile electronic device; and/or enabling colleague A to cover for a working colleague B who has a day off by checking working colleague B's "Work contacts" bin during the day.

In exemplary embodiments, the un-wired application can function across all and/or some mobile electronic devices; can function on various carrier levels; can function on various host network systems; can communicate automatic replies based on the mode of communication attempts received (e.g., responds to texts with texts, calls with voice replies, etc.); can function with IM's texts, Skype, emails, calls and/or texts; and/or can provide (e.g., in default mode) an auto reply alerting all and/or some contacts trying to communicate with users that their communication attempts may not be received by the user until a later time.

In exemplary embodiments, the un-wired application can provide a one-click activated default, for example, easily accessible via user input(s) on and/or affiliated with graphical user interface(s), setting that can silence all and/or some alerts affiliated with the mobile electronic device, filter out all and/or some communication attempts, and/or communicates customizable replies to all and/or some communication attempts. In exemplary embodiments, utilizing this simple, single button method can make un-wiring substantially easy and/or can make adding contacts, whose communication users may want to accept, substantially user-friendly (e.g., users may merely need to check contacts, contact groups, etc.).

In exemplary embodiments, bins can be stored in a similar fashion like email tags with services such as Google Gmail. While users can create their own tags (e.g., presented as bins), some standard bins (e.g., which can be edited) can be automatically created by default for each un-wired user. Seeing the bins as tags, can enable users to assign multiple tags/bins to contacts, communication attempts, and/or customizable replies. For example, there can be many relationships between contacts and/or bins as well as between customizable replies and/or bins.

In exemplary embodiments, bins can also be used to select information that can be shared between multiple devices and/or multiple un-wired users. By way of example, un-wired user A can make his "Work" bin available to un-wired user B, who can see the "Work" bin of un-wired user A among the list of his own bins. In exemplary embodiments, the un-wired application can utilize basic bin assignments and/or structures. Further, in exemplary embodiments, the un-wired application can utilize hierarchical bin structures, for example, where each bin has a parent bin (e.g., either "root" or another bin). Of course, other assignments and/or structures can be utilized by the un-wired application.

In exemplary embodiments, bins can be used as folders into which information affiliated with incoming communication attempts can be placed (e.g., "tagged"). In exemplary embodiments, all and/or some communication attempts can be displayed in a single bin. Further, users can create and/or customize further bins (e.g., various contact in their device can be assigned to a specific bin) such that communication attempts can be sorted. For example, upon re-wiring, bins can be used to sort out communication attempts from Family members, Work, Girlfriends, and/or Spouses, to name a few.

Further, in exemplary embodiments, the un-wired application can include a screening filter function such that users can block incoming communication attempts from specific contacts (e.g., ex-boyfriend, landlord, etc.). Information about screened communication attempts can be placed in a default and/or generated screened bin and/or can be accessed there. In exemplary embodiments, users can further choose between various messaging options for communication attempts from screened contacts. For example, in response to a communication attempt "open" screened people can receive a specific customizable reply indicating to that contact that communication attempts from them will not be received by the user (i.e., they can be alerted that they may be being screened). For another example, "closed" screened contacts may not receive a specific customizable reply indicating to that person that communication attempts from them will not be received by the user; rather that contacts can be simply screened. In exemplary embodiments, for either "open" or "closed" screened contacts, the user can, if they chose to, receive information about screened communication attempts. Further, users can customize screening bins for particular contacts, specific contacts, and groups of contacts, to name a few.

In exemplary embodiments, the un-wired application can "pattern" communication attempts to, for example, manage how incoming information can be managed (e.g., responded to, not responded to, etc.). Patterns can include, but are not limited to: (i) recipient and/or reply patterns that a user, and/or number of users, groups together in a pattern (e.g., "Mom", "Family", "Boss", "Mates", etc.) and/or after a pattern is, for example, defined, the user can assign any number of his contacts to that pattern; (ii) mail communication attempt patterns that can define how any incoming e-mails may be replied to; (iii) text communication attempt patterns that any incoming texts may be automatically answered by a reply text, defined by the pattern; (iv) call communication attempts patterns that callers can listen to a recorded voice-mail or video-mail, either default or customized, which informs them of the un-wired status of the recipient; and/or (v) default communication attempts patterns, which can take effect as soon as the user is, for example, un-wired and/or if for any incoming communication attempts has no specific pattern is, for example, defined by.

Further, in exemplary embodiments, the un-wired application can pattern communication attempts that can cause incoming communication attempts (e.g., text, mail, call, etc.) to be checked by the un-wired application such that: (a) if the contact has a particular pattern assigned to it, the un-wired application reacts according to that pattern; and/or (b) if no specific pattern is, for example, set, a default pattern can be used. By way of example, patterns for e-mails can contain any written text, pictures, and/or icons, to name a few; patterns for texts and/or MMS can contain a short text (e.g., 50 to 250 characters), icons (e.g., SMS, MMS, etc.), rich media email, and/or small gifs or jpgs, to name a few; and/or patterns for incoming calls can contain recorded voice-mail, and/or any other reasonable pattern.

In exemplary embodiments, the un-wired application can comprise, amongst other things, smart filtration, for example, that one click-activated and/or that can accept only desired communication and/or communicates auto-reply to those filtered out. This can allow users to personalize their outgoing text and/or voice replies for missed calls (e.g., hi mom, sorry I can't talk, love you, etc.). Further, in exemplary embodiments, the un-wired application can provide users with the option of customizing multiple replies for individual contacts (e.g., hi mom, sorry missed call, loving camp, will call when free and/or at the same time: hey Guys, playing basketball until 3, come to courts when you get this, etc.).

Figure 4:
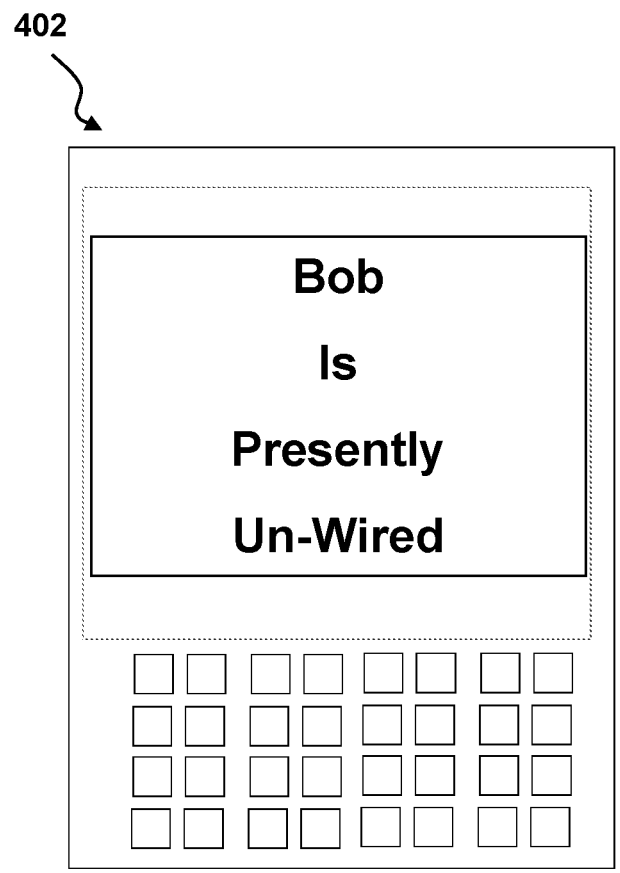
FIG. 4 is a drawing illustratively depicting various elements of status posts, in accordance with exemplary embodiments of the present invention.
Figure 5:
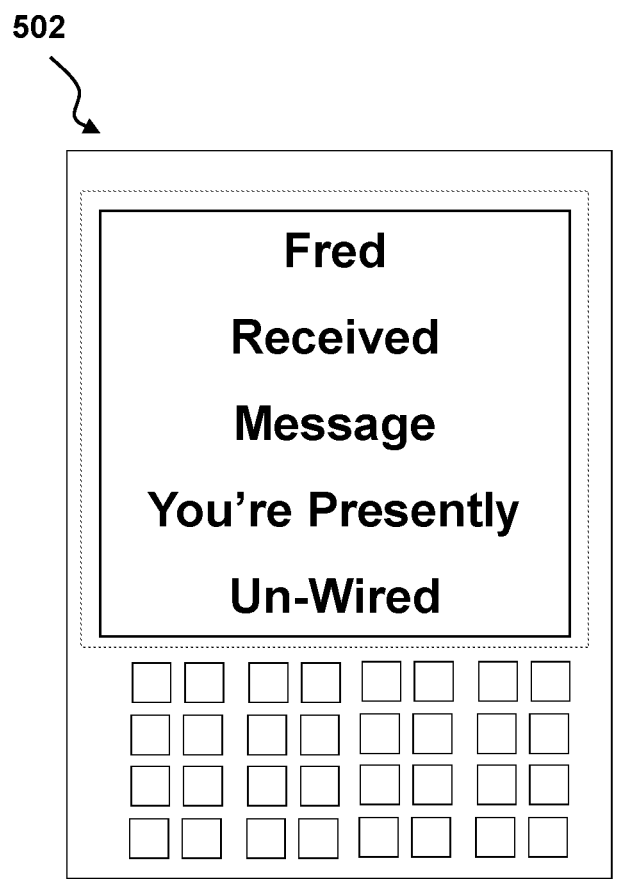
FIG. 5 is a drawing illustratively depicting various elements of status posts, in accordance with exemplary embodiments of the present invention.

Referring to FIGS. 4-5, in exemplary embodiments, status posts can enable fellow users of the un-wired application to see when contacts may be un-wired and/or when they re-wire. This can be utilized such that, amongst other things, users do not waste time and/or money with communication attempts (e.g., calling, texting, etc.) when a contact is, for example, un-wired. Further, this can minimize the risk of disturbing a contact when they see the contact may be busy (e.g., in office but on a mobile electronic device, babysitting but on a mobile electronic device, etc.) or, conversely they will know how to get in touch with contacts (e.g., at noisy party, here is the address, etc.). Further, status posts and/or status overviews can provide lists of all and/or some contacts using the un-wired application showing their current status. This can be done such that, communication attempts (e.g., phone calls, texts, etc.) may not be communicated to a contact that may be un-wired anyway.

Still referring to FIGS. 4-5, in exemplary embodiments, unlike a mere busy signal, the un-wired application can provide contacts attempting communications to users with the knowledge that their communication attempts may not be received by user until a later time. This can free users from the expectation of providing immediate replies and/or let other know the user may be busy. An optional screen saver may appear over un-wired user's mobile electronic device.

Further still, referring to FIGS. 4-5, in exemplary embodiments, the un-wired application can be used to convey information not only to the user, but also to the contact (e.g., so the contact knows their communication attempts may not be presently received). As mentioned above, the user can thus go off line with the peace of mind that contacts need not continue multiple communication attempts and/or suspecting the user is neglecting and/or screening their communication attempts.

In exemplary embodiments, the un-wired application can be utilized to create family time, for example, allowing parents on a family phone plan to unwire their children during dinner, homework, and/or bedtime hour. Further, in exemplary embodiments, the un-wired application can be utilized for regular un-wiring, for example, for sleep, work, driving and/or workout routines and/or any time battery goes dead. In exemplary embodiments, the un-wired application can be utilized by users to create time when they do not wish to be disturbed, are unavailable, have a commitment, and/or for any time when they do not to desire immediately receiving communication attempts.

In exemplary embodiments, the un-wired application can provides a unwire calendar for students, for example, based on the duration of a school's class time and/or automatically unwires student's mobile every school day during class hours and/or automatically re-wires the student during free periods, weekends, and/or holidays. Utilizing this, a user may activate an audio alert to sound 5 or 10 minutes before each class period to notify user when to head to class. Further, in exemplary embodiments, students may also sync schedules with peers to, for example, coordinate free periods and/or post status symbols to update peers about where to find them during free periods. Further still, in exemplary embodiments, teachers and/or school administrators may also update and/or post on a school wide calendar (e.g., snow day: all class is, for example, canceled, etc.).

In exemplary embodiments, the un-wired application's network calendar may also be used for other organizations interested in un-wiring and/or schedule syncing to coordinate busy and/or free periods of members (e.g., hospitals, office staffs, multi-player online gaming etc.).

In exemplary embodiments, the un-wired application can allow for the creation of unique auto-replies, avatars, and emoticon avatars, for example, that can be used to illustrate the reason for un-wiring and/or customizable replies that can let users communicate out an "I'm un-wired reply" with unique font, background, possible audio/video.

The un-wired application can offer substantially powerful replies composing functionalities for the user going beyond standard replies such as, but not limited to email, SMS, voice, video call applications, while at the same time maintaining a substantially user friendly interface. Therefore, auto-completion with reply contents from previous communication attempts and/or replies can be provided as well as interaction patterns known from form letter functions in popular word processing software and/or recommended replies based on groups and/or context (e.g., time, location, previous interactions, etc.).

In exemplary embodiments, when the user desires to receive the missed communication attempts they can end the period of being un-wiring (e.g., become re-wired) and/or be provided with an overview of the missed communication attempts. For example, when re-wired all and/or some missed communication attempts not displayed to the user when un-wired can be displayed. Accordingly, the un-wired application can ensure missed communication attempts when un-wired may not be lost because when re-wired (e.g., no longer un-wired), the user can receive an overview of all and/or some communication attempts that came in while being un-wired.

In exemplary embodiments, for example, depending on the host network system, re-wiring can also initiate a synchronization of the missed communication attempts information from the host network system, the corresponding client, and/or mobile electronic device that even might have physically missed some communication attempts due to, for example, bad reception.

In exemplary embodiments, a number of filter settings (e.g., time; date; form of communication-mail, text, call; and/or number of communication attempts; etc.) can be utilized to, for example, minimize the difficulty obtaining an overview of the missed communication attempts. Further, based on the intensity of the missed communication attempts and/or the assumed priority of the communication originator (e.g., VIP contacts), some entries can be highlighted for faster interaction.

In exemplary embodiments, when re-wired and/or checking the appropriate bins, users can immediately contact individuals and/or groups who made a communication attempts that was missed when un-wired. For example, there can be a simple icon displayed with at least some of the communication attempt's information (e.g., in a bin, library, etc.), which can enable users to contact the person affiliated with a particular missed communication attempts by selecting an icon and/or button. In exemplary embodiments, (e.g., by default), the user can contact the person in the same form as the missed communication attempts. In other instances, the user can contact the person using a different form than the missed communication attempts form.

Figure 6:
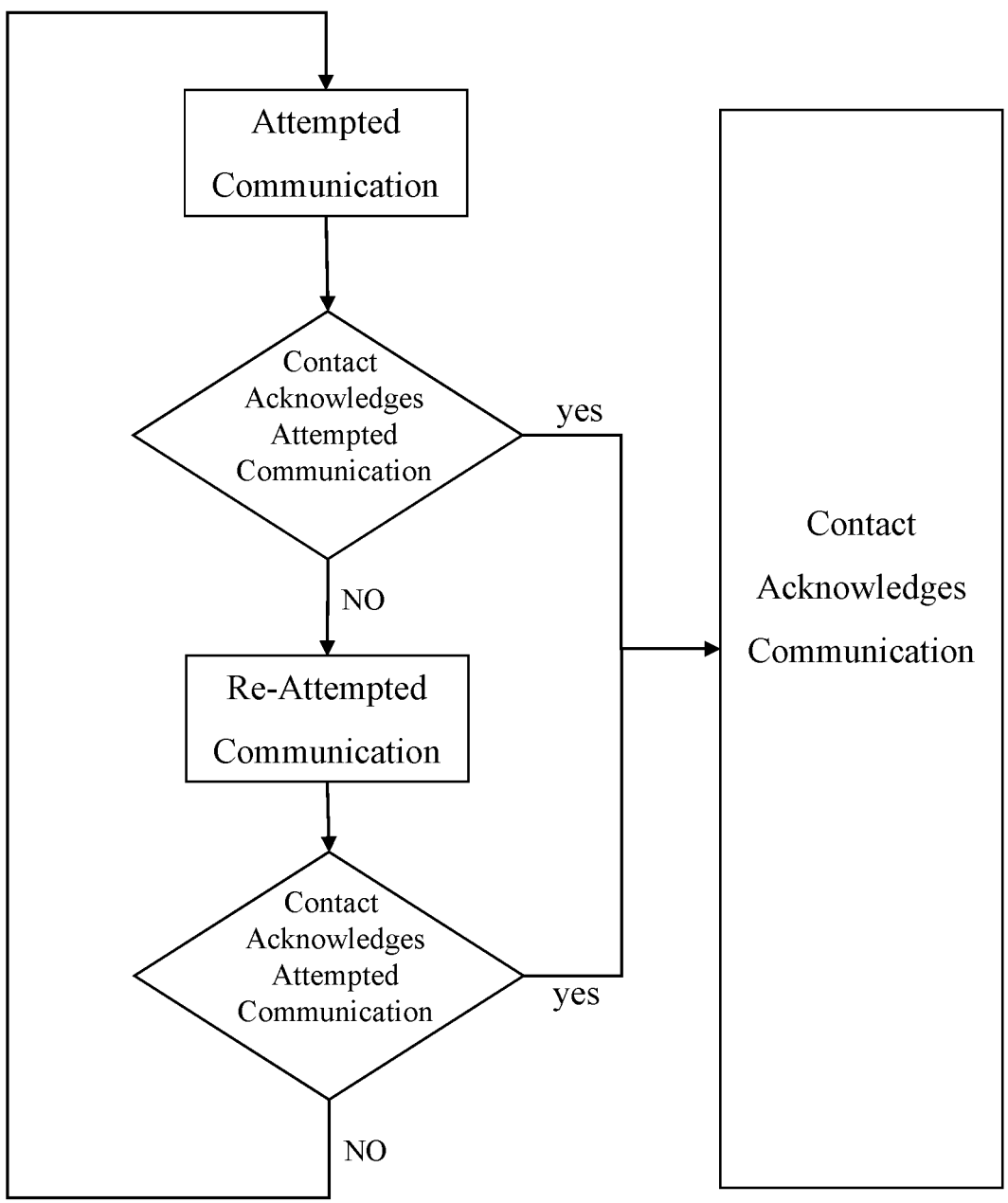
FIG. 6, is a flowchart illustratively depicting various elements of a blitz function, in accordance with exemplary embodiments of the present invention.

Referring to FIG. 6, in exemplary embodiments, the systems and methods can include a blitz function, which can repeatedly transmit communication attempts (e.g., call, text, etc.) to a contact over a set period of time, for example, every 10 minutes until the contact acknowledges receipt of user's blitz. In exemplary embodiments, the blitz function can be for emergency situations, opportunities that can not wait, battery dead contacts, worried parents, and/or concerned lovers, to name a few.

In exemplary embodiments, the systems and methods can include a surveillance function, which can repeatedly alert users of a specified contact's communication attempts, missed calls, emails, text messages, IM status change, until various user acknowledges receipt of various alerts. Surveillance information may also include additional information such as, but not limited to, noteworthy information, weather (e.g., rain, not sun, etc.), stock-shifts, sport scores, and/or traffic jams, to name a few.

In all and/or some of these applications, the mobile electronic device can perform tasks without the user's active input and/or with minimal user input(s). Further, these applications can also work with the above idea of smart filtration.

In exemplary embodiments, the systems and methods can include a smart stack function that can display all and/or some missed communication attempts with icons, easily browsable icons, and/or rolodex format (e.g., akin to iPad's flip-board, etc.), to name a few. For example, a check list can allow users to remove communication attempts that have been replied to from the stack and/or continually display communication attempts in need of reply.

In exemplary embodiments, the systems and methods can include an auto-stack function that can allow the user, when not un-wired, to filter a log of all and/or some missed communication attempts (e.g., calls, texts, skypes, IM's, emails, etc.) into the smart stack. Further, while un-wired, the smart stack function may be used as a screen saver, for example, allowing the user to check for missed communication attempts with, for example, a quick glance to mobile electronic device and/or to reply to communication attempts from smart stack without distractions from incoming communication attempts.

In exemplary embodiments, the surveillance function can keep track of information the user may have missed while un-wired (e.g., collect the content of pressing traffic and/or weather reports; specified face-book updates and/or tweets; feeds from favorite blogs and/or websites, etc.). Further, the surveillance function can present the information in the user's smart stack which may be accessed at any time (e.g., not only when user is, for example, un-wired). This feature can allow the user to remain apprised of information without the need to substantially frequently search the internet.

It will be understood that while most, if not all, of the functionalities provided by surveillance can be available in the form of individual stand-alone application for different mobile electronic devices, surveillance can be an integrated approach to combine these kinds of pull/push services with the power and/or the available user context and/or information affiliated the un-wired application. For example, surveillance could pro-actively pull and/or search for supplemental information connected to the missed communication attempts, such that when the user re-wires, information such as, but not limited to, current traffic jams, weather information, and flight update information, to name a few, can be presented to users.

In exemplary embodiments, the un-wired application's smart stack function can allow user to maintain a log of missed communication attempts for as long as user desires and/or thereby to create a list of communication attempts in need of reply.

Figure 7:
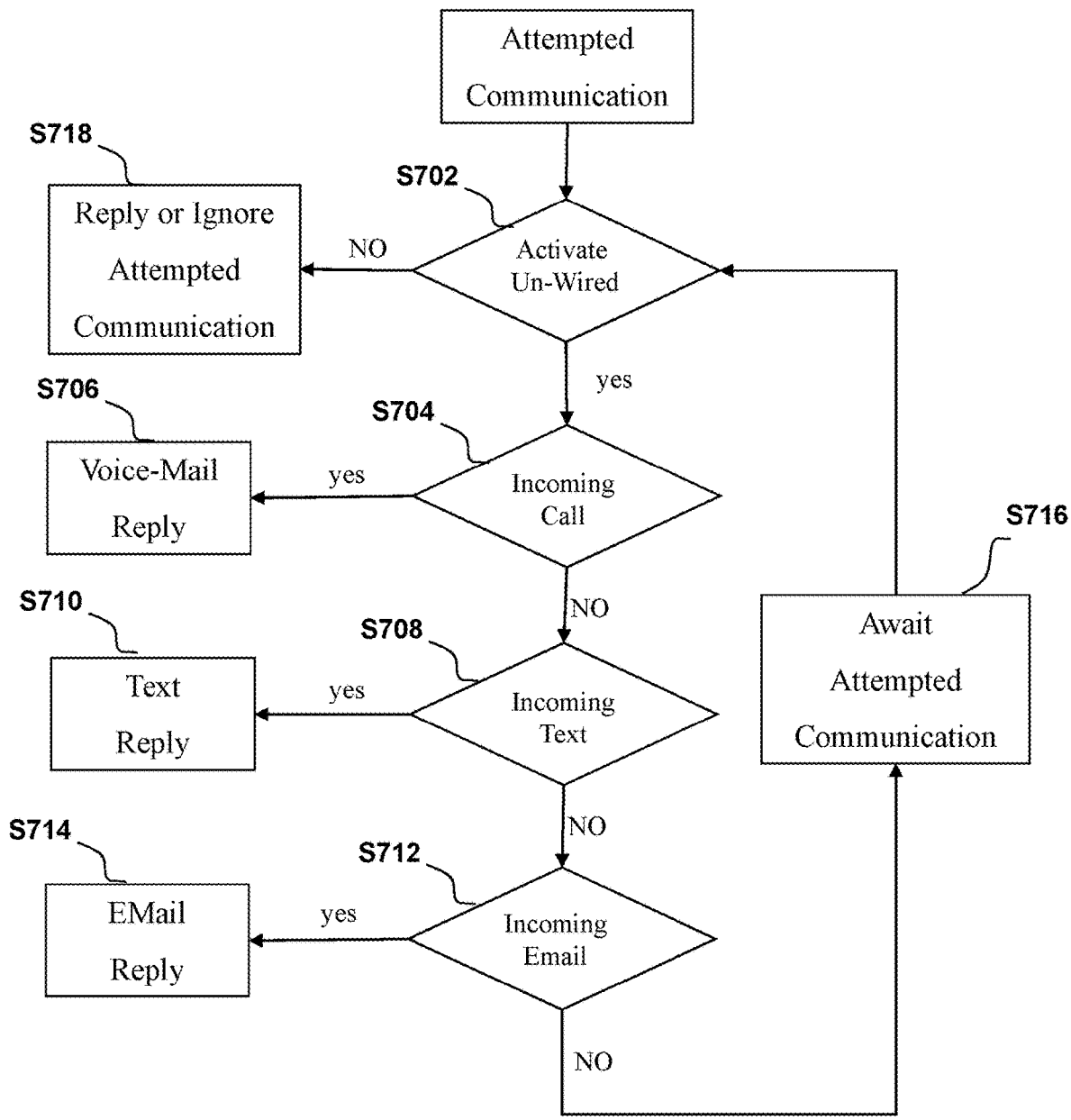
FIG. 7, is a flowchart illustratively depicting various replies to attempted communications, in accordance with exemplary embodiments of the present invention.

Referring to FIG. 7, in exemplary embodiments, when the un-wired application is, for example, activated (i.e., the user is, for example, un-wired), at S702, an individual attempting to communicate with the user can receive a different replies depending on how they are, for example, trying to communicate with the user. By way of example, when the un-wired application is, for example, activated for: (i) incoming communication calls, at S704, callers can listen to a recorded voice-mail and/or video-mail, either default and/or customized, which can inform them of the un-wired status of the user, at S706, (ii) incoming communication texts (e.g., SMS & MMS), incoming texts/MMS, at S708, can be automatically answered by a reply text/MMS, defined by patterns and/or bins; at S710, and/or (iii) incoming communication e-mails, at S712, users can define how incoming e-mails may be responded to, at S714, for example, because the un-wired reply can based on a default and/or customized reply mail. Of course if no communication is attempted, at S716, then no reply is responded to. Similarly, if the un-wired application is not active then no reply is responded to, at S718.

Figure 8:
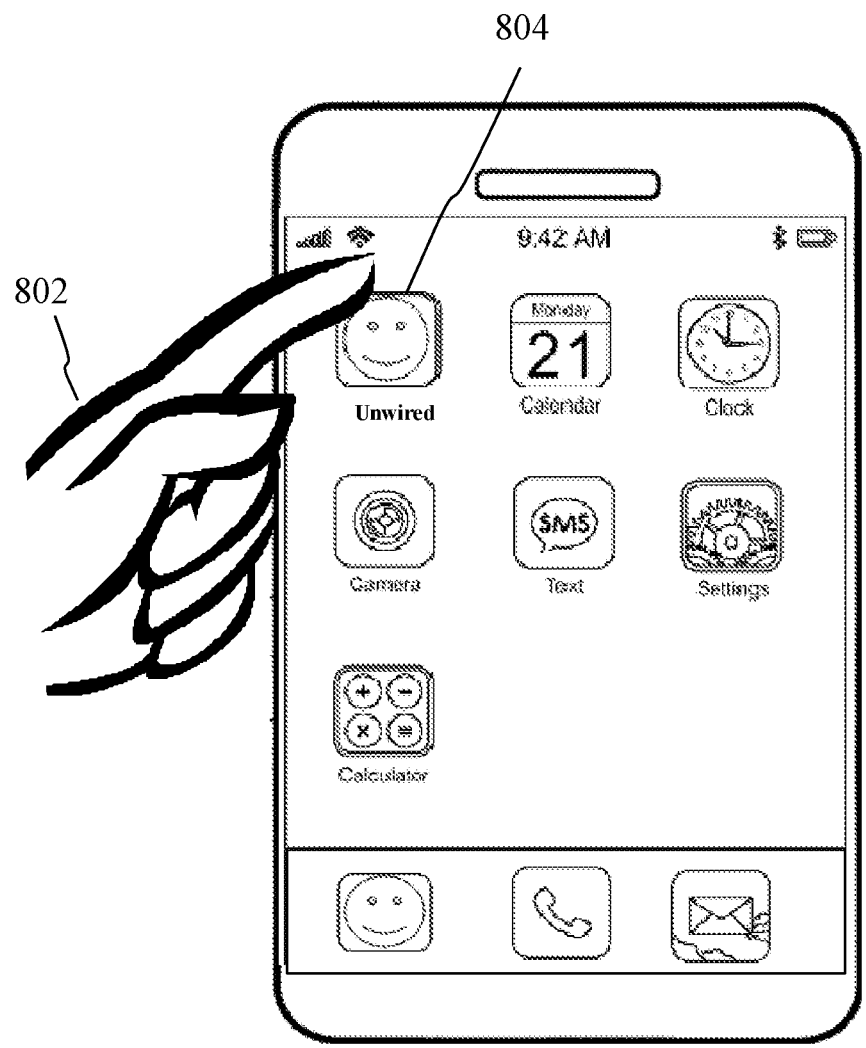
FIG. 8 is a drawing illustrating a user activating and de-activating the un-wired application, in accordance with exemplary embodiments of the present invention; in accordance with exemplary embodiments of the present invention.

By way of example, the un-wired application can be activated by a user 802 simply interacting with (e.g., touching) an icon and/or button 804, as illustrated below in FIG. 8. Similarly, to de-activate the un-wired application use 804 can simply interact with (e.g., re-touch) icon and/or button 804.

Figure 9:
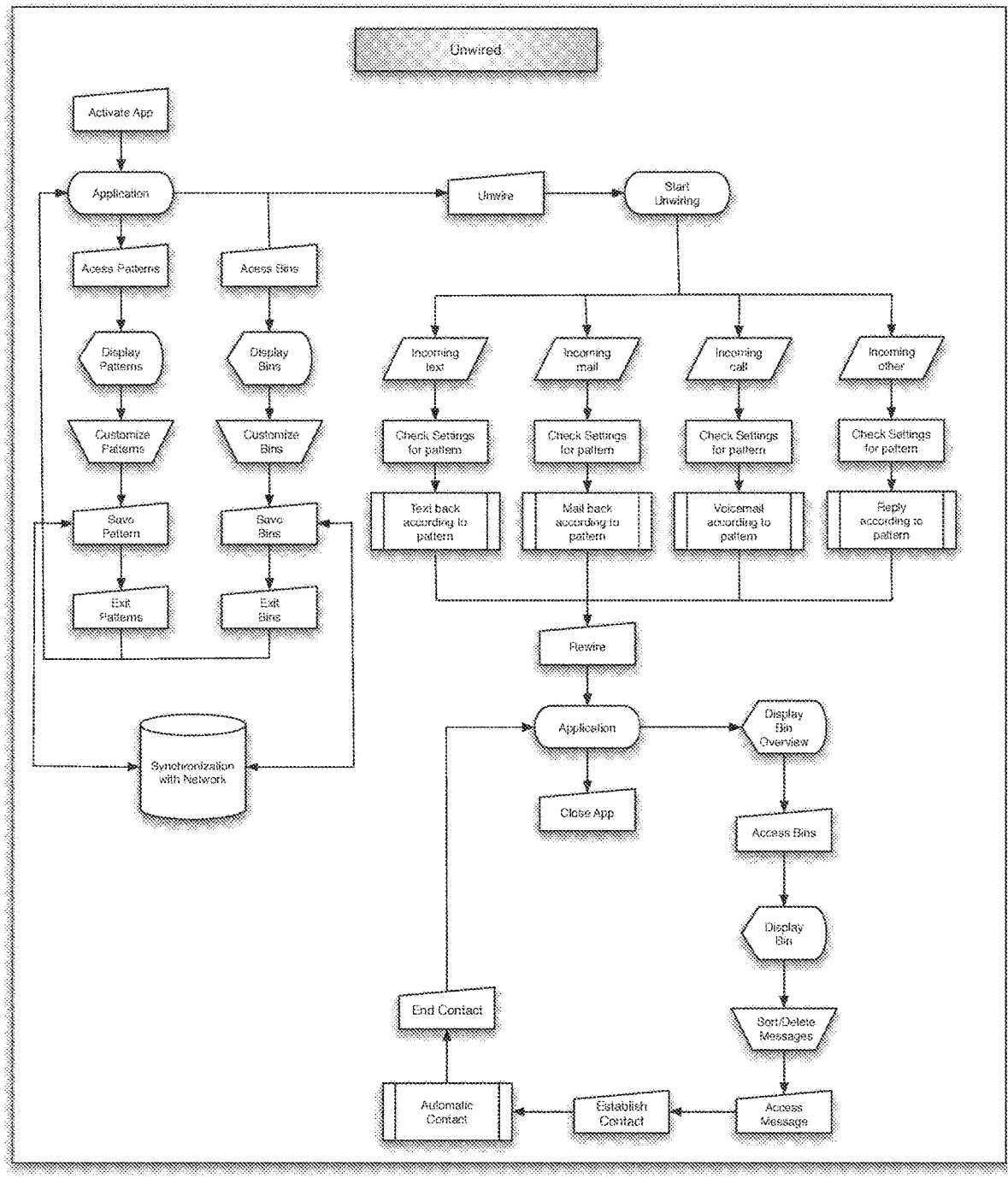
FIG. 9 is a block diagram of certain components of the systems and methods for users to receive information affiliated with communication attempts while remaining substantially disconnected from mobile electronic device(s) and/or network(s), in accordance with exemplary embodiments of the present invention.

Further, as discussed in greater detail herein as illustrated in FIG. 9, the un-wired application can be customized by the user for various communication attempts (e.g., calls, texts, files, e-mail, images, etc.) by patterning replies to communication attempts as well as using bins to receive information about missed communication attempts (e.g., when un-wired). This advanced customization of the un-wired application can be possible down to substantially detailed levels, but may not necessary for the un-wired application to function. That is, the user can still decide to only un-wire and/or re-wire with the one button.

In exemplary embodiments, to make the un-wired application substantially accessible, the un-wired application's features can be offered in three core components and/or "steps" to the user. It will be understood, that not all steps need be utilized. For example, some users may opt only to utilize the one button un-wired functionality, while other users may opt to utilize individual filters and/or communication functionalities. By way of example, (i) step one can include, but is not limited to, un-wiring (e.g., touch of a button, etc.), automated replies (e.g., calls, SMS, etc.), overview of missed communications (e.g., bins, etc.), and/or get in touch-establishing contact with any missed calls/SMS; (ii) step two can include, but is not limited to, customizable patterns, customizable bins, blind spot (e.g., blocking and/or replying to unwanted communication, etc.), surveillance, and/or status overview (e.g., users can see who may be online and/or who may be currently un-wired, etc.); and (iii) step three can include, but is not limited to, remote device management, information sharing with other devices and/or user, SMS through the un-wired application, calls (e.g., audio, video, etc.) through the un-wired application, and/or coordination of online status (e.g., for schools, hospitals, gamers, etc.).

Similar to existing special purpose applications on the market such as WhatsApp, direct communication between various un-wired users can be an integrated part of the un-wired application. In addition to the unique user contacts, the un-wired application's integrated text, voice and/or video messaging can directly take the recipients the un-wired application's status into account.

Further, in exemplary embodiments, it will be understood that the un-wired application is not only text, voice, and/or email. Rather, in exemplary embodiments, the un-wired application, for example, the default unwiring button can additionally unwire face-book updates, tweets, gaming reminders etc. Further the un-wired application can work with other aggregating apps, which may filter these feeds into single platform. This function of the un-wired application can be utilized to create a truly unwired experience.

It will be understood that any of the steps described can be rearranged, separated, and/or combined without deviated from the scope of the disclosure. For ease, steps are, at times, presented sequentially. This is merely for ease and is in no way meant to be a limitation.

Further, it will be understood that any of the elements and/or exemplary embodiments of described can be rearranged, separated, and/or combined without deviated from the scope of the disclosure. For ease, various elements are described, at times, separately. This is merely for ease and is in no way meant to be a limitation. While the various steps, elements, and/or exemplary embodiments of the disclosure have been outlined above, it is evident that many alternatives, modifications and variations will be apparent to those skilled in the art. The various steps, elements, and/or exemplary embodiments of the disclosure, as set forth above, are intended to be illustrative, not limiting. Various changes may be made without departing from the spirit and scope of the disclosure. Accordingly, now that exemplary embodiments of the present disclosure have been shown and described in detail, various modifications and improvements thereon will become readily apparent to those skilled in the art.

The invention claimed is:
1. A portable communications device, comprising:
an operating system comprising non-transitory readable storage medium storing a computer program configured to:
provide a user with an option to block certain alerts and communication attempts made by an attempting portable device to the portable communications device;
send an automatic message to the attempting portable device whereby the automatic message is only sent when the option to block certain alerts and communication attempts is selected by the user;
maintain a log of incoming communications during a period of time over which the option to block is enabled;
provide the log to the user either at a time after the option to block is disabled or during the time period that the option to block is enabled; and
provide a choice to the user to continue to receive certain alerts and communications generated by the portable communications device in response to incoming communications during the period of time that the option to block is enabled, whereby when the choice to continue to receive alerts is selected, alerts affiliated with communication attempts are automatically generated by the portable communications device in response to communication attempts made by the attempting portable device, and the messages are automatically transmitted to attempting portable devices that generate the alerts and communications until the option to block is disabled.

2. The portable communications device of claim 1 whereby the message comprises a status post to be displayed on the attempting portable device indicating that the user is presently unavailable.

3. The portable communications device of claim 1, comprising stored contacts, whereby the stored contacts are associated with attempting portable devices.

4. The portable communications device of claim 3, whereby the operating system is configured to receive a first identification of a first group of contacts.

5. The portable communications device of claim 4, whereby the operating system is configured to receive a second identification of a second group of contacts.

6. The portable communications device of claim 5, whereby the operating system is configured to receive a first customized message.

7. The portable communications device of claim 6, whereby the operating system is configured to receive a second customized message.

8. The portable communications device of claim 7, whereby the operating system is configured to transmit the first customized message to attempting portable devices associated with the first group of contacts and to transmit the second customized message to attempting portable devices associated with the second group of contacts.

9. The portable communications device of claim 8, wherein the first customized message and second customized message are transmitted to an attempting portable devices in the same communications mode as the incoming communication from the attempting portable devices.

10. The portable communications device of claim 5, wherein the operating system is configured to provide an option to block incoming communications from attempting portable devices associated with the first group of contacts or to block incoming communications from attempting portable devices associated with the second group of contacts.

11. A portable communications device, comprising:
an operating system comprising non-transitory readable storage medium storing a computer program configured to:
  a. provide a user with an option to create a first group of contacts and a second group of contacts;
  b. provide, a user with an option to block any one or more of:
    i) audio alerts from attempting portable devices;
    ii) visual alerts from attempting portable devices;
    iii) telephonic communication attempts made by attempting portable devices to the portable communications device;
    iv) audio alerts from applications associated with the portable communications device;
    v) visual alerts from applications associated with the portable communications device;
  provide an option for the user to block any of i, ii, or iii from attempting portable devices associated with either the first group of contacts or the second groups of contacts;
  whereby the option to block is initiated by any one of:
    vi. a manual input received on the portable communications device;
    vii. automatic initiation based on predetermined schedule; and
  provide an option for the user to send an automatic message in response to contact attempts to the attempting portable devices associated with the first group of contacts or to send an automatic message to the attempting portable devices associated with the second group of contacts during the time that the option to block is enabled;
  maintain a log of incoming communications during a period of time over which the option to block is enabled;
  provide the log to the user either at a time after the option to block is disabled or during the time period that the option to block is enabled; and
  provide an option to the user to continue to receive certain alerts generated by the attempting portable communications devices or the applications associated with the portable communications device in response to incoming communications during the period of time that the option to block is enabled, whereby when the choice to continue to receive alerts is selected, alerts affiliated with communication attempts are automatically generated by the portable communications device in response to communication attempts made by the attempting portable device, and the messages are automatically transmitted to attempting portable devices that generate the alerts and communications until the option to block is disabled.

12. The portable communications device of claim 11, whereby the automatic message comprises a predetermined message.

13. The portable communications device of claim 12, whereby the automatic message is customized by the user.

14. The portable communications device of claim 11, further comprising a screen saver comprising the log of incoming communications.

15. The portable communications device of claim 11, further comprising an icon indicating that the option to block is enabled.

16. The portable communications device of claim 11, whereby the log comprises icons selectable by a user to reply to reply to missed communication attempts in the same form as the missed communication attempts.

17. The portable communications device of claim 11, whereby the automatic message comprises a status post to be displayed on the attempting portable device indicating that the user is presently unavailable.

18. A portable communications device, comprising:
an operating system comprising non-transitory readable storage medium storing a computer program configured to:
provide a user with an option to create a first group of contacts and a second group of contacts;
provide, a user with an option to block any one or more of:
audio alerts from attempting portable devices;
  i) alerts from attempting portable devices;
  ii) telephonic communication attempts made by attempting portable devices to the portable communications device;
  iii) alerts from applications associated with the portable communications device;
provide an option for the user to block any of i, or ii from attempting portable devices associated with either the first group of contacts or the second groups of contacts;
whereby the option to block is initiated by any one of:
  iv) a manual input received on the portable communications device;
  v) automatic initiation based on predetermined schedule; and maintain a log of incoming communications during a period of time over which the option to block is enabled;

provide the log to the user either at a time after the option to block is disabled or during the time period that the option to block is enabled; and provide an option to the user to continue to receive certain alerts generated by the attempting portable communications devices or the applications associated with the portable communications device in response to incoming communications during the period of time that the option to block is enabled, whereby when the choice to continue to receive alerts is selected, alerts affiliated with communication attempts are automatically generated by the portable communications device in response to communication attempts made by the attempting portable device, and the messages are automatically transmitted to attempting portable devices that generate the alerts and communications until the option to block is disabled.

* * * * *